United States Patent
Kim (10) Patent No.: US 8,462,402 B2
(45) Date of Patent: Jun. 11, 2013

(54) METHOD AND APPARATUS FOR CONTROLLING LIGHT SOURCE IN IMAGE SCANNING APPARATUS

(75) Inventor: Kyung-rok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 12/923,618

(22) Filed: Sep. 29, 2010

(65) Prior Publication Data

US 2011/0085213 A1 Apr. 14, 2011

(30) Foreign Application Priority Data

Oct. 14, 2009 (KR) ........................ 10-2009-0097740

(51) Int. Cl.
*H04N 1/04* (2006.01)
(52) U.S. Cl.
USPC ............ 358/475; 358/461; 358/474; 358/498
(58) Field of Classification Search
USPC .......................... 358/475, 461, 474, 498, 497
See application file for complete search history.

(56) References Cited

U.S. PATENT DOCUMENTS

| 5,513,018 A | * | 4/1996 | Nisimura ...................... 358/474 |
| 6,700,683 B1 | | 3/2004 | Hashizume |
| 2006/0250661 A1 | | 11/2006 | Susaki |

FOREIGN PATENT DOCUMENTS

| EP | 0083176 | 7/1983 |
| JP | 10-257314 | 9/1998 |

OTHER PUBLICATIONS

Extended European Search Report issued Nov. 6, 2012 in corresponding European Patent Application No. 10187473.3.

* cited by examiner

*Primary Examiner* — Houshang Safaipour
(74) *Attorney, Agent, or Firm* — Staas & Halsey LLP (57) ABSTRACT

The method to control a light source in an image scanning apparatus includes emitting light onto a reference surface having a predetermined reflectivity from a light source, detecting a shading level representing an intensity of the light reflected from the reference surface, and controlling the light intensity from the light source by using the shading level and the reference level.

18 Claims, 7 Drawing Sheets

METHOD AND APPARATUS FOR CONTROLLING LIGHT SOURCE IN IMAGE SCANNING APPARATUS

CROSS-REFERENCE TO RELATED APPLICATIONS

This application claims the benefit of Korean Patent Application No. 10-2009-0097740, filed on Oct. 14, 2009, in the Korean Intellectual Property Office, the disclosure of which is incorporated herein in its entirety by reference.

BACKGROUND

1. Field

The present general inventive concept relates to a method and apparatus for controlling a light source in an image scanning apparatus.

2. Description of the Related Art

Image scanning apparatuses emit light onto a document by using a light source, and generate image data by performing a photoelectric conversion on light reflected off the document via an image sensor. Here, a light emitting diode (LED) or an organic LED (OLED) is used as the light source, and the lifespan of the light source is determined according to the environment in which the light source is used, for example, determined by temperature, humidity, and magnitude of an electric current applied to the light source. In general, when temperature and humidity are high and an electric current applied to the light source is large, deterioration of the light source is accelerated, and accordingly, intensity of scanned light is gradually reduced even with a constant applied current. That is, the light intensity is reduced according to cumulative time of using the light source. In addition, fine dust may be stacked on an optical device that is used to scan the image data, and accordingly, transmittance and reflectivity of the optical device may be reduced. Thus, quality of scanned images may be low due to reduction of the light intensity, and reduction of the transmittance and reflectivity of the optical device.

SUMMARY

An aspect of the present general inventive concept provides a method and apparatus for controlling a light source in an image scanning apparatus for improving quality of scanned images.

An aspect of the present general inventive concept also provides a computer readable recording medium having embodied thereon a program for executing the above method in a computer.

According to an aspect, there is provided a method of controlling a light source in an image scanning apparatus, the method including: emitting light from the light source onto a reference surface having a predetermined reflectivity; detecting a shading level representing an intensity of the light reflected from the reference surface; comparing the detected shading level with a reference level representing the predetermined reflectivity of the reference surface; and controlling the intensity of the light emitted from the light source by using the detected shading level and the reference level according to a result of the comparison.

According to another aspect, there is provided a computer readable recording medium having embodied thereon the method of controlling the light source in the image scanning apparatus.

According to another aspect, there is provided a light source control apparatus for controlling a light source of an image scanning apparatus, the light source control apparatus including: a light source to emit light onto a reference surface having a predetermined reflectivity; a detector to detect a shading level representing an intensity of the light reflected from the reference surface, wherein the detector detects image data of a document from the light scanned and reflected from the document; a storage unit to store a reference level representing the predetermined reflectivity of the reference surface; a comparator to compare the shading level with the reference level stored in the storage unit; a light intensity controller to control the intensity of the light emitted from the light source by using the detected shading level and the reference level according to a comparison result; and an output unit to output the detected image data.

According to another aspect, there is provided an image scanning apparatus including: a detector to detect a shading level that represents an intensity of light which is emitted onto a reference surface having a predetermined reflectivity and reflected from the reference surface, wherein the detector detects image data of a document from the light emitted and reflected from the document; a comparator to compare the shading level with a reference level that represents the predetermined reflectivity of the reference surface; a light intensity controller to control the intensity of the light emitted from the light source by using the shading level and the reference level according to the comparison result; and an output unit to output the detected image data.

According to another aspect, there is provided an image forming apparatus including: an image scanning apparatus to detect a shading level that represents an intensity of light which is emitted onto a reference surface having a predetermined reflectivity and reflected from the reference surface, to compare the shading level with a reference level that represents the predetermined reflectivity of the reference surface, to control the intensity of the light emitted from the light source by using the shading level and the reference level according to the comparison result, to scan image data of a scanned object from the light reflected from the scanned object; and an image forming unit to form an image of printing data representing the image data scanned by the image scanning apparatus.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

Hereinafter, embodiments will be described with reference to accompanying drawings.

Figure 1:
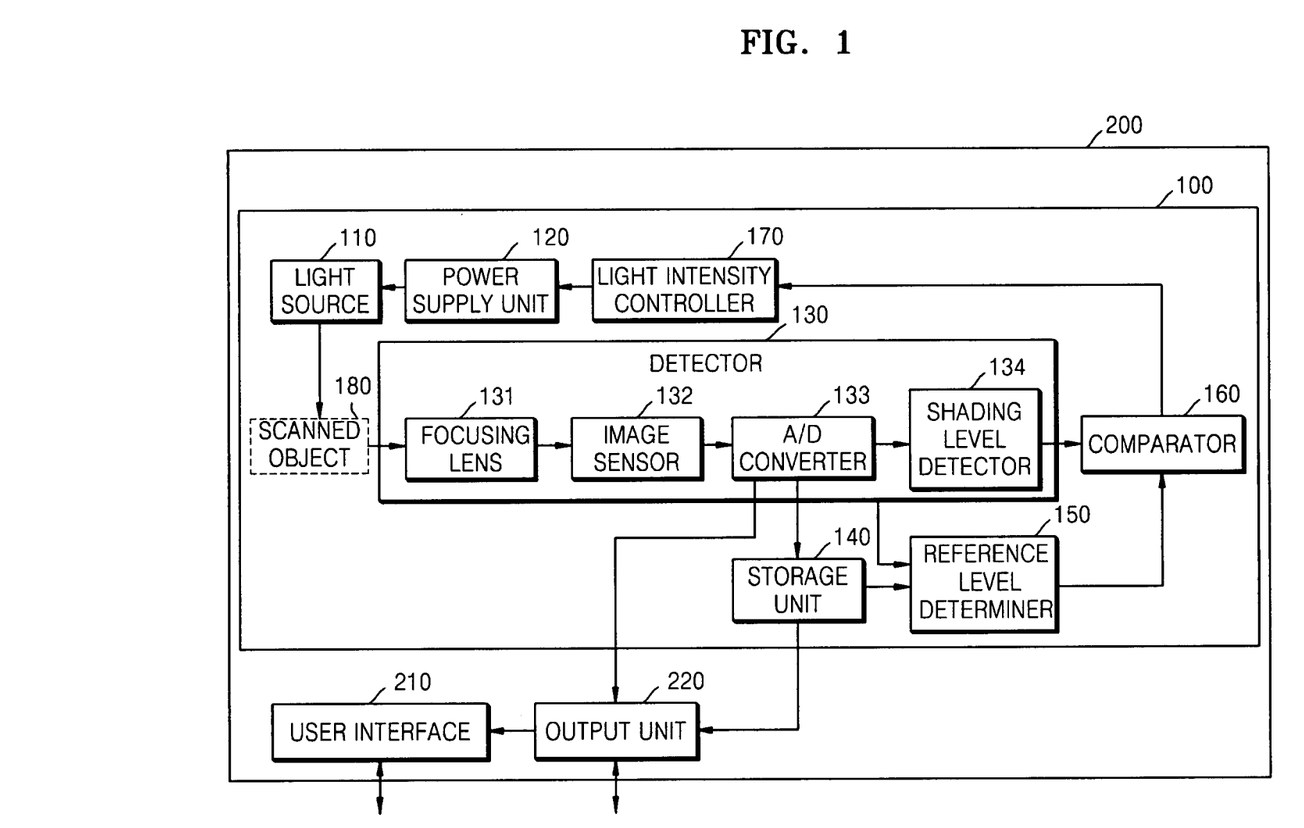
FIG. 1 is a block diagram of an image scanning apparatus according to an embodiment.

FIG. 1 is a block diagram of an image scanning apparatus 200 according to an embodiment. Referring to FIG. 1, the image scanning apparatus 200 of the present embodiment includes a light source control unit 100, a user interface (UI) unit 210, and an output unit 220. The light source control unit 100 includes a light source 110, a power supply unit 120, a detector 130, a storage unit 140, a reference level determiner 150, a comparator 160, and a light intensity controller 170. The detector 130 includes a focusing lens 131, an image sensor 132, an analog/digital (A/D) converter 133, and a shading level detector 134.

In FIG. 1, only components of the image scanning apparatus 200 relating to the present embodiment are shown. Therefore, one of ordinary skill would appreciate that universal components in addition to the components shown in FIG. 1 may be included in the image scanning apparatus 200. Hereinafter, it is assumed that the light source control unit 100 of FIG. 1 is coupled to the image scanning apparatus 200 for the sake of convenience. However, the present general inventive concept is not limited thereto, that is, the light source control unit 100 may be formed independently from the image scanning apparatus 200.

The image scanning apparatus 200 scans an image of an object 180. Here, scanning means a process of converting an image of the scanned object 180, which may be, for example, a photograph, a picture, or a document, to image data. The image data is output from the output unit 220 of the image scanning apparatus 200. That is, the image data may be displayed on the UI unit 210, displayed as an image on a host device, a universal computer system, or a personal digital assistant (PDA) that is connected to the image scanning apparatus 200 through the output unit 220, or transferred via fax, e-mail, or server, or copied via an image forming apparatus including the image scanning apparatus 200. Here, the UI unit 210 includes any of input/output devices such as a display panel, a mouse, a keyboard, a touch screen, a monitor, and a speaker, and the output unit 220 includes any of devices that have a communication function by which may receive and transmit data via a network. In addition, the output unit 220 of the present embodiment may include a modem that may be used in fax transmission of data with an external device, a network module for connecting to a network, and a universal serial bus (USB) host module for forming a data transmission channel to a portable storage medium.

Therefore, the user may scan the image of the object 180, for example, a document, by manipulating the UI unit 210 of the image scanning apparatus 200. That is, the light source 110 may emit light onto the object 180, and image data transmitting through the focusing lens 131, the image sensor 132, and the A/D converter 133 may be stored in the storage unit 140, displayed to the user through the UI unit 210, or displayed on an external device connected to the image scanning apparatus 200 through the output unit 220.

The light source 110 may emit light onto the object 180. Here, the light source 110 may be a light emitting diode (LED) or an organic LED (OLED), however, the present general inventive concept is not limited thereto. That is, any kind of light source that may emit light onto the object 180 at a light intensity that may be adjusted by adjusting a current or voltage may be used as the light source 110.

The power supply unit 120 may apply a current or voltage to the light source 110 to drive the light source 110. In the present embodiment, the power supply unit 120 may apply power to the light source control unit 100 by using electric power supplied from outside of the light source control unit 100.

The detector 130 may detect a shading level representing an intensity of the light which is emitted onto the object 180 by the light source 110 and reflected from the object 180. Referring to FIG. 1, the detector 130 includes the focusing lens 131, the image sensor 132, the ND converter 133, and the shading level detector 134.

The detector 130 may detect the shading level of the object 180, and generates image data corresponding to the object 180. Here, quality of the generated image data is determined according to performances of the light source elements such as the light source 110, the focusing lens 131, and the image sensor 132 in the light source control unit 100. That is, the shading level detected by the detector 130 varies depending on total usage time of the light source 110, variations in reflectivity of the focusing lens 131, variations in transmittance of the focusing lens 131, and variations in sensitivity of the image sensor 132. Therefore, the light source control unit 100 may remove variations of the shading level by using a reference surface having a predetermined reflectivity.

The reference surface having the predetermined reflectivity includes a shading patch and a shading patch reference member which are provided in the light source control unit 100. Here, the reference surface is generally attached to the light source control unit 100. However, the present general inventive concept is not limited thereto. The light source control unit 100 may adjust the intensity of light emitted from the light source 110 by using a reference level provided by the reference surface, that is, the predetermined reflectivity of the reference surface. At this time, the predetermined reflectivity denotes the intensity of light reflected by the reference surface with respect to the intensity of light scanned onto the reference surface, and is determined according to characteristics of the reference surface, and thus, is not limited to a certain level. In addition, the reference level may be stored in the storage unit 140 in advance.

The detector 130 detects the shading level of the reference surface, which may be the scanned object 180. The light source 110 emits light onto the reference surface, and light reflected by the reference surface is focused on the image sensor 132 through the focusing lens 131. The image sensor 132 photoelectrically converts optical energy of the focused light into electric energy, such as into a current or voltage, and the A/D converter 133 converts the electric energy into digital values.

The focusing lens 131 is a device for forming an image of the scanned object 180 by using phenomena such as reflection and refraction of light, and the image sensor 132 is a device for converting information corresponding to the scanned object 180 obtained from the focusing lens 131 into electric image signals and may be a charged coupled device (CCD) sensor. Accordingly, the image sensor 132 outputs a voltage that is proportional to the intensity of light reflected by the reference surface. The A/D converter 133 converts the continuous voltage output from the image sensor 132 into discrete digital values.

Since the focusing lens 131, the image sensor 132, and the A/D converter 133 are obvious to one of ordinary skill in the art, detailed descriptions of those elements are not provided here.

The shading level detector 134 detects the shading level representing the intensity of the light reflected by the reference surface by using the output values of the A/D converter 133. The shading level detector 134 detects the shading level of the reference surface according to predetermined conditions. Here, the predetermined conditions are the same as conditions, stored in the storage unit 140, when the reference level is detected, for example, the predetermined condition is calculating an average of the shading levels of each of all the pixels measured in light intensity measurement area.

Figure 2:
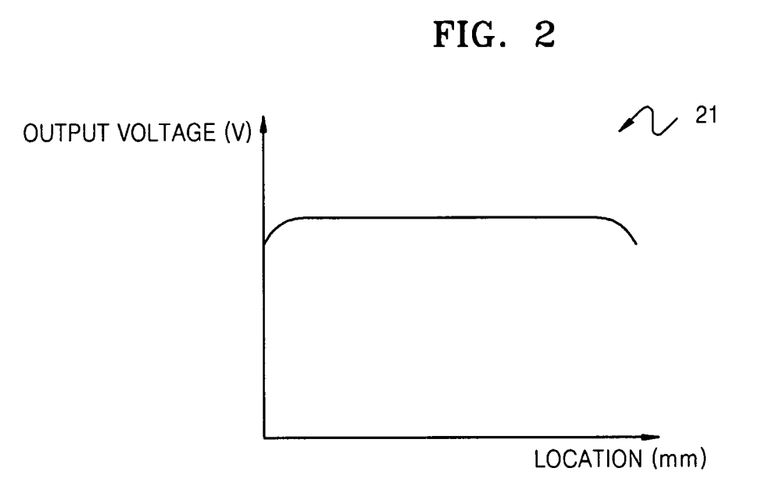
FIG. 2 is a graph showing an output voltage of an image sensor versus intensity of light scanned by a light source and reflected by a reference surface according to an embodiment.

FIG. 2 is a graph showing an output voltage of the image sensor 132 with respect to the intensity of the light reflected by the reference surface after being emitted from the light source 110. Referring to FIG. 2, a graph 21 shows the voltage output from the image sensor 132 corresponding to different portions of the reference surface. Here, the locations of the reference surface are determined based on when the reference surface is scanned in a main-scanning direction. However, the present general inventive concept is not limited thereto, that is, the reference surface may be scanned in a sub-scanning direction.

The output voltage of the image sensor 132 is converted into digital values representing shading levels of each of pixels by the A/D converter 133, and the shading detector 134 detects the shading level of the reference surface with reference to the shading levels of the pixels represented by the digital values.

Here, the shading level detector 134 may detect the shading level of the reference surface according to the predetermined conditions (described above). For example, an average of the shading levels of all the pixels of the reference surface is calculated to obtain the shading level of the reference surface, or an average of the shading levels of pixels included in a certain region of the reference surface is calculated to obtain the shading level of the reference surface.

The predetermined conditions for detecting the shading level of the reference surface by the shading level detector 134 are the same as those for detecting the reference level stored in the storage unit 140. That is, the light source control unit 100 compares the detected shading level with the reference level stored in the storage unit 140 in advance to control the intensity of emitted light, and accordingly, the shading level and the reference level should be detected under the same conditions as each other.

Referring to FIG. 1, the storage unit 140 stores the reference level that represents the reference reflectivity of the reference surface. Here, the storage unit 140 may be a read only memory (ROM), a random access memory (RAM), a flash memory, a hard disk that is a kind of magnetic memory device, or an optical disk drive.

The reference level is detected when the light source control unit 100 is fabricated, or before degradation of the light intensity of the light source 110 and degradation of the transmittance and reflectivity of the focusing lens 131 due to the continuous use of the light source control unit 100, and then, the detected reference level is stored in the storage unit 140.

Therefore, although the reference level stored in the storage unit 140 and the shading level detected by the detector 130 represent the intensities of the light reflected by the same reference surface, the shading level and the reference level may have different values from each other due to performance reduction of the light source 110, the focusing lens 131, and the image sensor 132 in the light source control unit 100. The light source control unit 100 controls the intensity of the light emitted from the light source 110 by using the difference between the shading level and the reference level in order to improve the quality of images scanned by the image scanning apparatus.

In addition, the reference level is detected under the same predetermined conditions as those for detecting the shading level, as described above.

The storage unit 140 may store the reference level as a value, or may store an equation for determining the reference level. When the equation for determining the reference level is stored in the storage unit 140, the reference level determiner 150 may determine the reference level.

The reference level determiner 150 determines the reference level with reference to data representing scanning properties of the image scanning apparatus 200. The image scanning apparatus 200 determines scanning resolution, scanning speed, and exposure time of the image sensor 132 according to scanning properties of the image scanning apparatus 200, and the reference level determiner 150 determines the reference level with reference to the scanning resolution, the scanning speed, and the exposure time of the image sensor 132, which are data representing the scanning properties of the image scanning apparatus 200.

Here, a user of the image scanning apparatus 200 may set the scanning resolution of the image scanning apparatus 200 and then the image scanning apparatus 200 may automatically determine the scanning speed and the exposure time of the image sensor 132 according to the set scanning resolution. The reference level determiner 150 determines the reference level with respect to the reference surface with reference to the data representing the above properties.

Since the shading level of the reference surface is detected by the shading level detector 134 according to the scanning speed and the exposure time of the image sensor 132, which are determined according to the scanning resolution set by the user of the image scanning apparatus 200, the reference level determiner 150 determines the reference level according to the same scanning properties. Therefore, the intensity of the light emitted from the light source 110 is adjusted by comparing the reference level with the shading level in a state where conditions of the light source 110, the focusing lens 131, and the image sensor 132 are the same as each other except for reductions in performances, and accordingly, quality of image data generated by the image scanning apparatus 200 may be improved.

The comparator 160 compares the shading level detected by the detector 130 with the reference level stored in the storage unit 140. At this time, the reference level may be determined by the reference level determiner 150. In addition, the comparator 160 compares the shading level with a predetermined range of the reference level stored in the storage unit 140. The predetermined range may be set to be about 90% to about 110% of the reference level, and may be set variously according to usage environment.

The light intensity controller 170 controls the intensity of the light emitted from the light source 110 according to the comparison result of the comparator 160. That is, the light intensity controller 170 adjusts the power applied from the power supply unit 120 to the light source 110 to control the intensity of the light emitted from the light source 110.

Therefore, the light intensity controller 170 adjusts the current or voltage applied to the light source 110 according to a ratio of the reference level with respect to the shading level to control the intensity of light emitted from the light source 110. For example, the light source 110 is an LED or an OLED, the intensity of the light emitted from the light source 110 may be controlled by adjusting the current or voltage applied to the light source 110.

If the shading level detected by the detector 130 is not included in the predetermined range of the reference level, the light intensity controller 170 adjusts the current applied to the light source 110 according to the ratio of the reference level with respect to the detected shading level to control the light intensity. The intensity of the light emitted from the light source 110 is changed in proportion to the current applied to the light source 110, and the voltage output from the image sensor 132 is linearly changed according to the change in the intensity of the emitted light.

Figure 3:
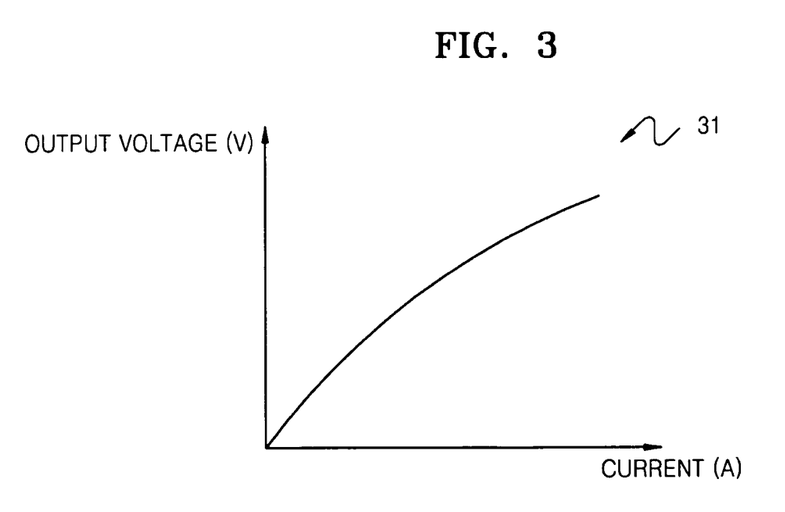
FIG. 3 is a graph showing a voltage output from an image sensor versus an electric current applied to a light source according to an embodiment.

FIG. 3 is a graph 31 showing the voltage output from the image sensor 132 with respect to the current applied to the light source 110 according to an embodiment. Referring to the graph 31 of FIG. 3, when the current applied to the light source 110 linearly increases, the output voltage of the image sensor 132 also linearly increases in proportion to the current. That is, the current applied to the light source 110 may be adjusted to control the intensity of the light emitted from the light source 110, and the output voltage of the image sensor 132 is controlled according to the light intensity emitted.

Referring to FIG. 1 again, the light intensity controller 170 adjusts the current applied to the light source 110 according to characteristics of the light source 110 shown in the graph 31 of FIG. 3 to control the intensity of light emitted from the light source 110. For example, the current adjusted by the light intensity controller 170 may be expressed by equation 1.

$$If_c = k \frac{L_c}{L_o} If \qquad (1)$$

where If denotes a current applied from the power supply unit 120 to the light source 110 in order to detect the shading level of the reference surface, $If_c$ denotes a current adjusted by the light intensity controller 170, $L_o$ denotes the shading level detected by the detector 130, $L_c$ denotes the reference level stored in the storage unit 140, and k is a rational number.

As expressed by equation 1, the light intensity controller 170 adjusts the current applied to the light source 110 according to the ratio of the reference level with respect to the shading level to control the light intensity. That is, when the reference level is greater than the shading level, the current applied to the light source 110 is increased to increase the intensity of the light emitted from the light source 110. On the other hand, when the reference level is less than the shading level, the current applied to the light source 110 is reduced to reduce the intensity of the light emitted from the light source 110. Therefore, quality of image data generated by the image scanning apparatus 200 may be improved according to characteristics of the light source 110, the focusing lens 131, and the image sensor 132.

In addition, when the shading level detected by the detector 130 is not included in the predetermined range of the reference level, the light intensity controller 170 may adjust a duty ratio of a pulse width modulation (PWM) signal according to the ratio of the reference level with respect to the shading level in order to adjust the current applied to the light source 110 and control the light intensity. The intensity of the light emitted from the light source 110 is changed in proportion to the duty ratio of the current applied to the light source 110, and the voltage output from the image sensor 132 is linearly changed according to the light intensity.

Figure 4:
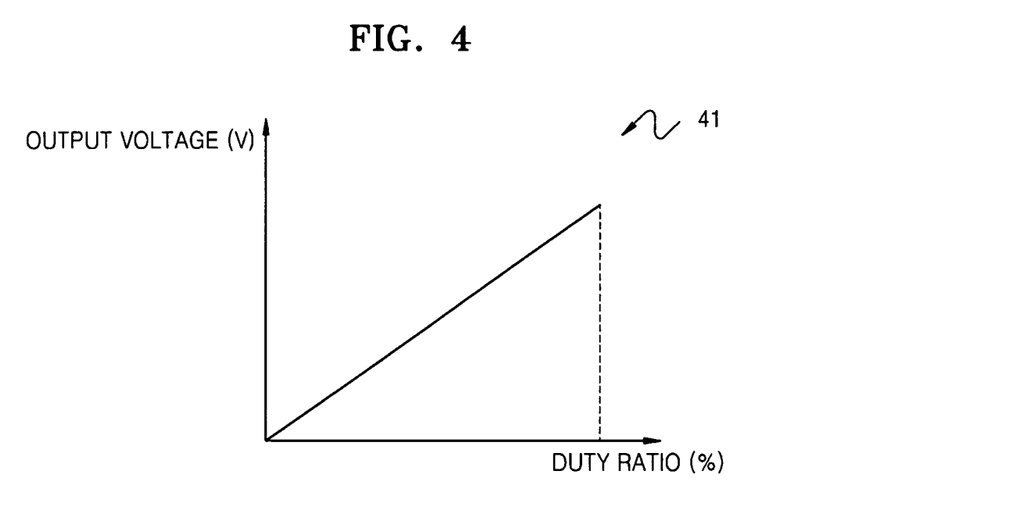
FIG. 4 is a graph showing a voltage output from an image sensor versus a duty ratio of the electric current applied to the light source according to the embodiment.

FIG. 4 is a graph showing a voltage output from the image sensor 132 with respect to a duty ratio of the current applied to the light source 110 according to an embodiment of the present general inventive concept. Referring to graph 41 of FIG. 4, when the duty ratio of the current applied to the light source 110 is increased, the output voltage of the image sensor 132 is increased linearly in proportion to the duty ratio. That is, the intensity of the light emitted from the light source 110 is adjusted by adjusting the duty ratio of the current applied to the light source 110, and the output voltage of the image sensor 132 may be adjusted according to the light intensity.

Referring to FIG. 1 again, the light intensity controller 170 adjusts the duty ratio of the current applied to the light source 110 by using the above characteristics of the light source 110 shown in FIG. 4 to control the intensity of the light emitted from the light source 110. For example, the duty ratio of the current adjusted by the light intensity controller 170 may be expressed by equation 2.

$$DR_c = k \frac{L_c}{L_o} DR \qquad (2)$$

where DR denotes a duty ratio of the current applied from the power supply unit 120 to the light source 110 in order to detect the shading level of the reference surface, $DR_c$ is a duty ratio of the current controlled by the light intensity controller 170, $L_o$ denotes the shading level detected by the detector 130, $L_c$ denotes the reference level stored in the storage unit 140, and k is a rational number.

As expressed by the above equation 2, the light intensity controller 170 adjusts the duty ratio of the current applied to the light source 110 according to the ratio of the reference level with respect to the shading level to control the light intensity. That is, when the reference level is greater than the shading level, the duty ratio of the current applied to the light source 110 is increased to increase the intensity of the light emitted from the light source 110. On the other hand, when the reference level is less than the shading level, the duty ratio of the current applied to the light source 110 is reduced to decrease the intensity of the light emitted from the light source 110. Therefore, quality of the image data generated by the image scanning apparatus 200 may be improved according to the characteristics of the light source 110, the focusing lens 131, and the image sensor 132.

The method of controlling the current by using the duty ratio of a PWM signal is well known in the art, and thus, detailed descriptions are not provided here.

In addition, when a magnitude of the current that is adjusted to control the intensity of the light emitted from the light source 110 is equal to a predetermined value or greater, the light intensity controller 170 controls the light intensity by adjusting the magnitude of the current to be at the predetermined value. This is to prevent an over current from being applied to the light source 110 and damaging the light source 110. At this time, the predetermined value is included in a range of allowable power of the light source 110. That is, the predetermined value may be the magnitude of the largest current or the largest voltage that may be applied to the light source 110.

In addition, when the shading level detected by the detector 130 is not included within the predetermined range of the reference level, the light intensity controller 170 adjusts the voltage applied to the light source 110 according to the ratio of the reference level with respect to the detected shading level in order to control the light intensity. The adjustment of the voltage may be performed in consideration of the characteristic of the voltage output from the image sensor 132 with respect to the voltage applied to the light source 110.

However, when the intensity of the light emitted from the light source 110 is controlled by using the voltage, the light intensity increasing due to the increase of the voltage applied to the light source 110 is increased more rapidly than that adjusted by using the current, and accordingly, the voltage applied to the light source 110 is controlled carefully since the maximum voltage applied to the light source 110 is not high. Therefore, when the voltage is adjusted according to equation 1, k should be maintained equal to or less than 1.

In addition, when the shading level detected by the detector 130 is included in the predetermined range of the reference level, the light intensity controller 170 maintains the current or voltage applied from the power supply unit 120 to the light source 110.

Therefore, in the image scanning apparatus 200, the current or voltage applied to the light source 110 is adjusted by using the light source control unit 100, and accordingly, the image data generated may have improved quality without regard to the performance degradation of the light source 110, the focusing lens 131, and the image sensor 132 in the light source control unit 100.

In addition, as the intensity of the light emitted from the light source 110 is reduced as the total time of using the light source 110 increases, the intensity of the light incident on the image sensor 132 is reduced, and accordingly, the voltage output from the image sensor 132 is reduced. This causes degradation of a signal-to-noise ratio, and noise in an image scanned by the image scanning apparatus 200 increases, thereby degrading the image quality. Therefore, when the current applied to the light source 110 and the exposure time of the image sensor 132 is maintained constant, influences caused by the performance degradation of the light source 110 may remain uncorrected. Therefore, according to the light source control unit 100 of the present embodiment, the quality of image data generated by the image scanning apparatus 200 may be improved in response to the performance degradation of the focusing lens 131 and the image sensor 132, as well as the light source 110.

The image scanning apparatus 200 may further include one or more processors. In addition, each of the components in the image scanning apparatus 200 may correspond to one or more processors. The processor may include an array of a plurality of logic gates, or a combination of a universal micro processor and a memory storing a program executable in the micro processor.

Figure 5:
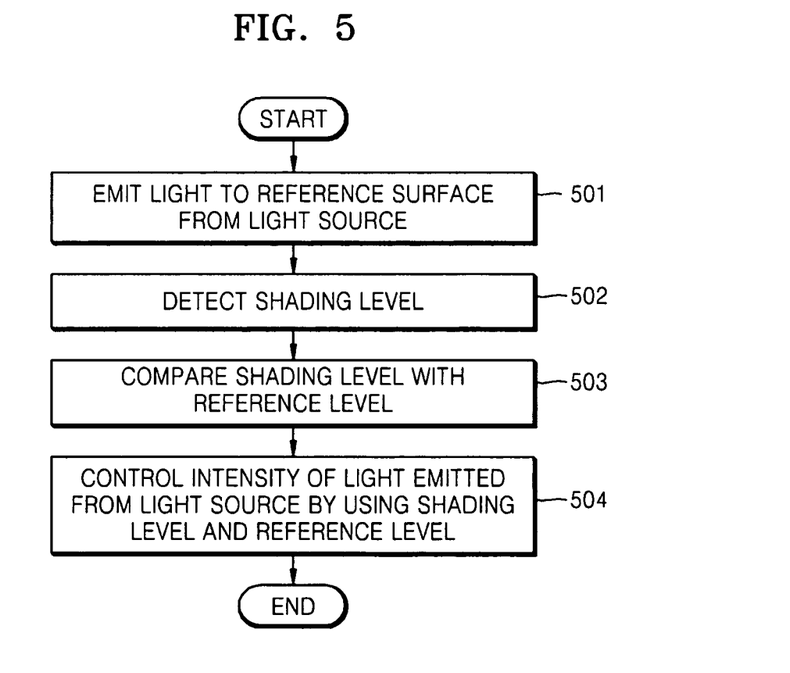
FIG. 5 is a flowchart illustrating a method of controlling a light source in an image scanning apparatus according to an embodiment.
Figure 6:
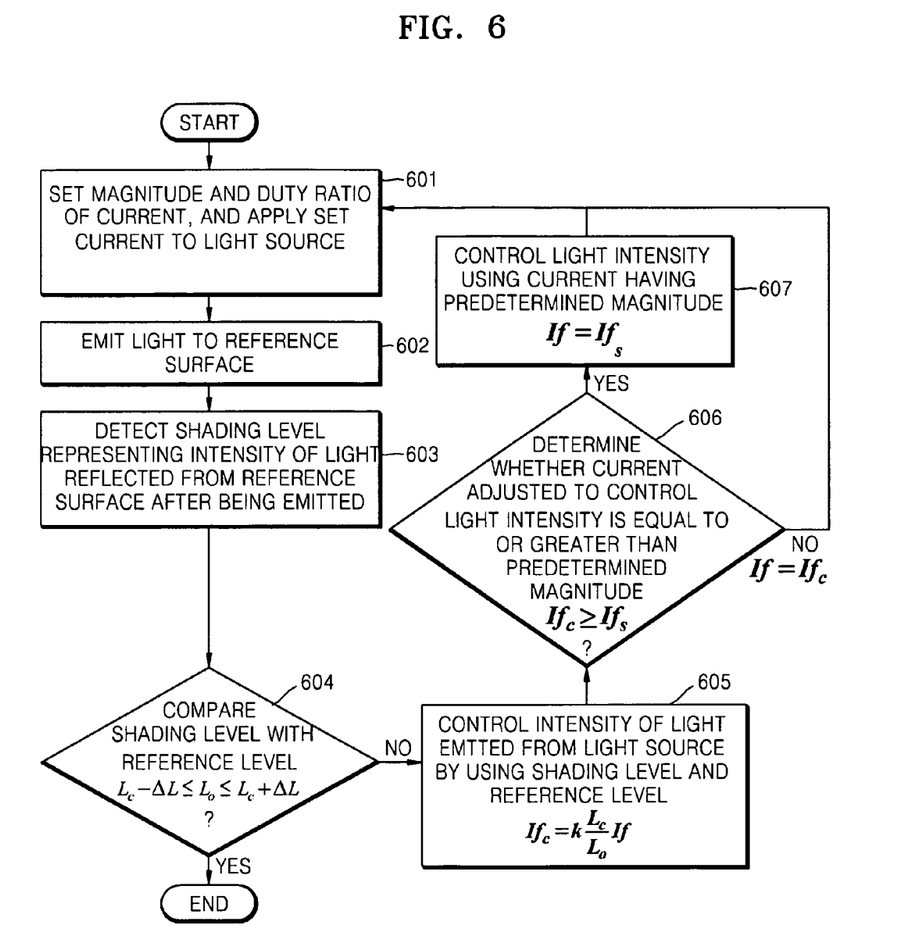
FIG. 6 is a flowchart illustrating a method of controlling a light source in an image scanning apparatus according to another embodiment.

Hereinafter, methods of controlling a light source of an image scanning apparatus 200 according to embodiments will be described with reference to FIGS. 5 and 6. Referring to FIGS. 5 and 6, the methods of controlling a light source in an image scanning apparatus 200 include operations time-serially processed in the light source control unit 100 of FIG. 1. Therefore, the above descriptions about the light source control unit 100 shown in FIG. 1 may be applied to the methods of controlling a light source of an image scanning apparatus 200 according to the present embodiments.

FIG. 5 is a flowchart illustrating a method of controlling a light source in an image scanning apparatus 200, according to an embodiment.

In operation 501, the light source 110 emits light onto a reference surface having a predetermined reflectivity. Here, the reference surface may be formed in the light source control unit 100.

In operation 502, the detector 130 detects a shading level representing intensity of the light reflected from the reference surface.

In operation 503, the comparator 160 compares the shading level detected in the operation 502 with a reference level representing the predetermined reflectivity of the reference surface. Here, the reference level may be read from the storage unit 140.

In operation 504, the light intensity controller 170 controls the intensity of the light emitted from the light source 110 according to the comparison result of operation 503.

FIG. 6 is a flowchart illustrating a method of controlling a light source in an image scanning apparatus 200, according to another embodiment concept with reference to FIG. 1.

FIG. 6 illustrates a method of controlling the intensity of the light emitted from the light source 110 by adjusting the magnitude of the current applied to the light source 110; however, one of ordinary skill in the art would appreciate that the intensity of the light emitted from the light source 110 may be controlled by adjusting a duty ratio in a PWM method or adjusting the voltage.

In operation 601, the power supply unit 120 sets the magnitude $I_f$ and the duty ratio DR of the current applied to the light source 110 and applies the current to the light source 110.

In operation 602, the light source 110 emits light onto the reference surface having a predetermined reflectivity.

In operation 603, the detector 130 detects the shading level Lo representing the intensity of the light reflected by the reference surface.

In operation 604, the comparator 160 compares the detected shading level Lo with the reference level Lc stored in the storage unit 140 in advance. That is, the shading level Lo detected by the detector 130 is compared with a predetermined range of the reference level Lc stored in the storage unit 140. Here, when it is assumed that the predetermined range is ΔL, the comparator 160 may perform according to inequality equation 3:

$$L_c - \Delta L \leq L_o \leq L_c + \Delta L \quad (3)$$

According to equation 3, if the shading level Lo detected by the detector 130 is included in the predetermined range, it is determined that the intensity of the light emitted from the light source 110 according to the currently set current and the duty ratio is appropriate, and the light source control unit 100 finishes the operation.

Furthermore, according to equation 3, if the shading level Lo detected by the detector 130 is not included in the predetermined range, the process goes to operation 605.

In operation 605, the light intensity controller 170 controls the intensity of the light emitted from the light source 110 by using the shading level Lo and the reference level Lc. The light intensity controller 170 may control the light intensity by adjusting the current applied to the light source 110 according to the ratio of the reference level Lc with respect to the shading level Lo. The adjustment of the current performed by the light intensity controller 170 may be expressed as following equation 4:

$$If_c = k \frac{L_c}{L_o} If \quad (4)$$

where If denotes the current applied from the power supply unit 120 to the light source 110, Ifc denotes the current controlled by the light intensity controller 170, Lo denotes the shading level detected by the detector 130, Lc denotes the reference level stored in the storage unit 140, and k is a rational number. K may be set variously according to conditions of use, and in the present embodiment, k may be 1.

In operation 606, the light intensity controller 170 determines whether the controlled current Ifc is equal to or greater than a predetermined magnitude Ifs in order to control the light intensity. The light intensity controller 170 may perform the determination according to inequality 5:

$$If_c \geq If_s \quad (5)$$

According to the determination result, when the current Ifc is equal to or greater than the predetermined value Ifs, the process goes to operation 607, and when the current Ifc is less than the predetermined value Ifs, the process goes to operation 601. That is, if the magnitude of the current Ifc of the controlled current is less than the predetermined magnitude Ifs, the light intensity controller 170 applies the current of the adjusted magnitude Ifc in operation 605 to the light source 110 to control the intensity of the light emitted from the light source 110.

In operation 607, the light intensity controller 170 controls the light intensity by using the current of the predetermined magnitude Ifs. That is, the light intensity controller 170 applies the current of the predetermined magnitude Ifs to the light source 110 in order to prevent over current flowing in the light source 110.

Therefore, the light source control unit 100 may control the current or voltage applied to the light source 110 in order to remove characteristic variation of the light source 110 and the image quality variation caused by increasing total time usage, and thus, constant image quality may be achieved in the image scanning apparatus 200.

In addition, the reference surface disposed to perform a shading correction that is generally performed in the image scanning apparatus 200 is used to control the light intensity, and thus, the light intensity of the light source 110 may be controlled without further forming additional hardware. Therefore, the image scanning apparatus 200 may perform the method of controlling the light intensity when the shading level detected from the reference surface in performing the shading correction is less or greater than the predetermined value, or the method of controlling the light source may be performed after performing a predetermined number of scanning operations in the image scanning apparatus 200. In addition, when the current or voltage applied to the light source 110 is changed due to the above controlling operation, the changed current or voltage may be maintained until the method of controlling the light source 110 is executed again.

Therefore, the image scanning apparatus 200 may scan an image of a document by using the current or voltage adjusted according to the method of controlling the light source 110 in the light source control unit 100, and thus, the quality of a scanned image may be improved.

Figure 7:
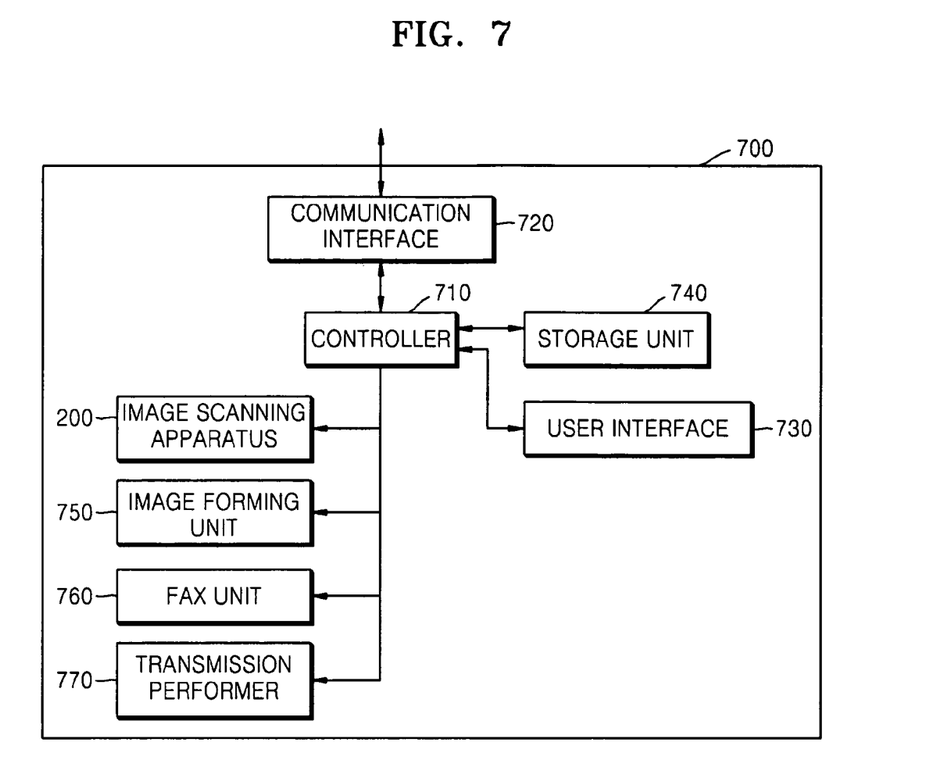
FIG. 7 is a block diagram of an image forming apparatus according to an embodiment.

FIG. 7 is a block diagram of an image forming apparatus 700 according to an embodiment. Referring to FIG. 7, the image forming apparatus 700 includes a controller 710, a communication interface 720, a user interface 730, a storage unit 740, an image forming unit 750, a fax unit 760, a transmission performer 770, and the image scanning apparatus 200.

The controller 710 controls overall operations of the image forming apparatus 700. The communication interface 720 transmits/received data to/from an external device via a network. The communication interface 720 according to the present embodiment may include a modem used in fax transmission, a network module for connecting to a network, and a USB host module for forming a data transmission channel to a portable storage medium according to functions of the image forming apparatus 700. Here, the external device connected to the image forming apparatus 700 through a wired/wireless network may be a fax machine, a computer system, a mobile device, a PDA, or a server.

The user interface 730 obtains input signals from a user, and displays information for the user. For example, the user interface 730 may include input/output devices of the image forming apparatus 700 such as a display panel, a mouse, a keyboard, a touch screen, a monitor, and a speaker.

The storage unit 740 stores data, printing data, and scan data that may be generated while the image forming apparatus 700 is operating. The image forming unit 750 may print a document, the fax unit 760 may fax a document, and the transmission performer 770 may transmit a document to external devices such as a server, a portable storage medium, and a computer system.

The image scanning apparatus 200 generates image data corresponding to the scanned object 180, for example, a document. Here, the image scanning apparatus 200 may further include the light source control unit 100, which controls the light source 110 of the image scanning apparatus 200. The image data generated by the image scanning apparatus 200 may be stored in the storage unit 740 as scan data, displayed through the user interface 730, or may be transmitted to the an external device through the communication interface 720. In addition, the image data generated by the image scanning apparatus 200 may be printed on a printing medium after being converted into printing data through the image forming unit 750, transmitted via a fax after being converted into fax data by the fax unit 760, or may be transmitted to the an external device by the transmission performer 770.

Figure 8:
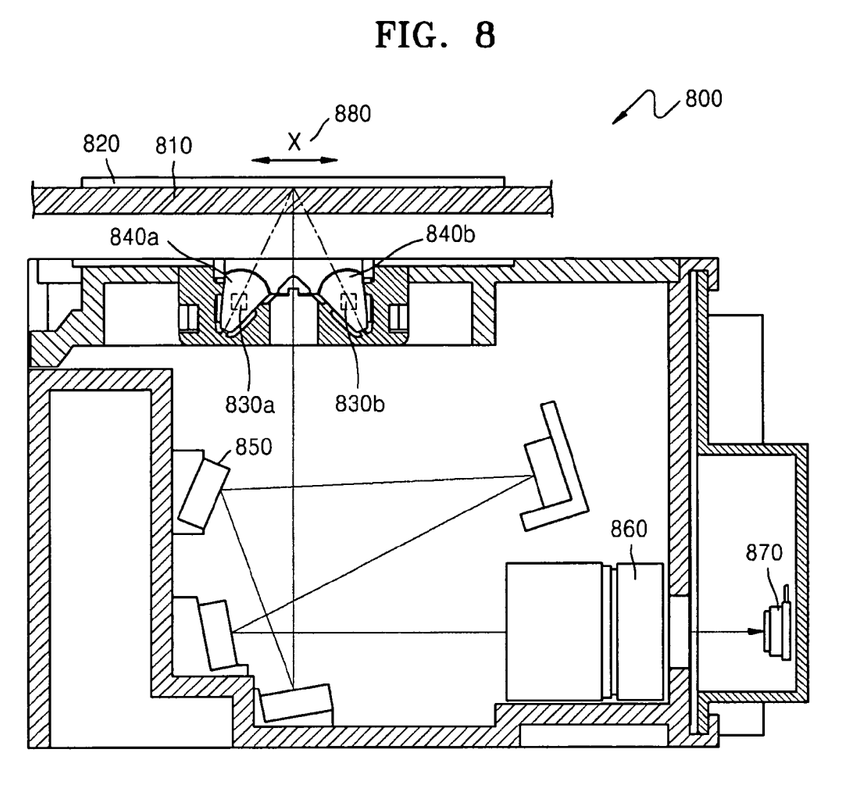
FIG. 8 is a schematic block diagram of an image scanning apparatus including a light guide according to an embodiment.

FIG. 8 is a schematic diagram of an image scanning apparatus 800 including light guides according to an embodiment. Referring to FIG. 8, the image scanning apparatus 800 including the light guide includes a document board 810, an object 820, a first light source 830a, a second light source 830b, a first light guide 840a, a second light guide 840b, one or more reflection mirrors 850, a focusing lens 860, and an image sensor 870.

The image scanning apparatus 800 including the light guides of FIG. 8 scans the image in a sub-scanning direction (X) 880. The first light source 830a and the second light source 830b emit light onto the object 820, for example, a document, on the document board 810. The light reflected from the object 820 is guided to the focusing lens 860 by the one or more reflection mirrors 850, and the focusing lens 860 focuses the light reflected from the scanned object 820 on the image sensor 870. In addition, the image sensor 870 photoelectrically converts optical energy to electric energy. Here, the image scanning apparatus 800 of the present embodiment may further include the first light guide 840a and the second light guide 840b, length direction of which is disposed in a main scanning direction, facing the document board 810.

Figure 9:
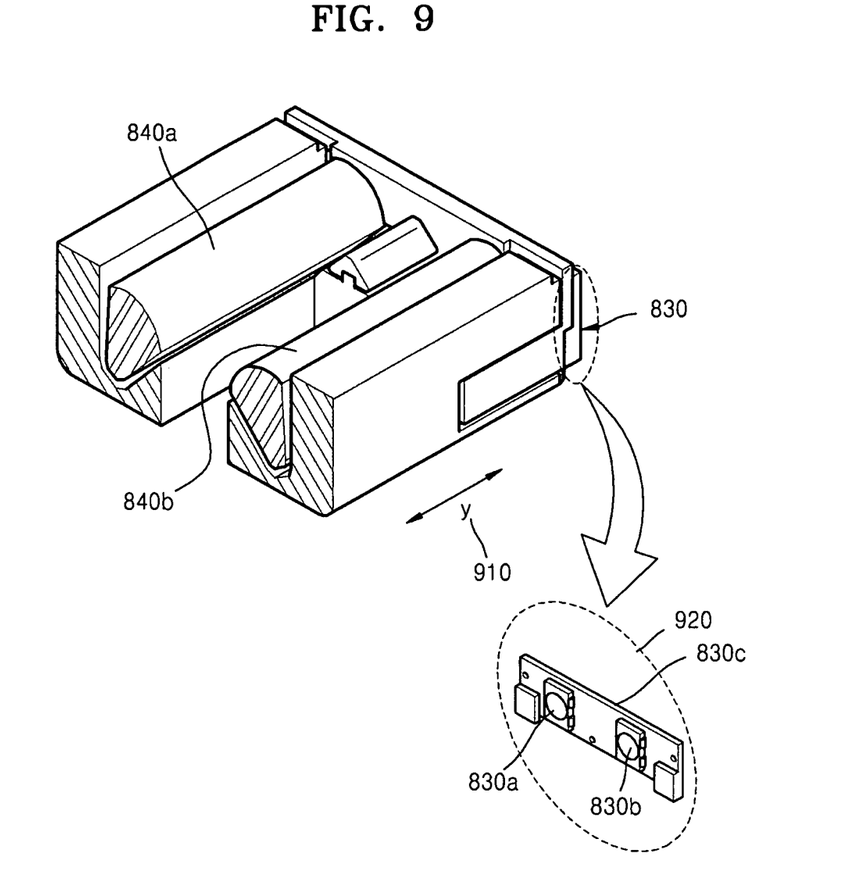
FIG. 9 is a partial cross-sectional view of a light guide according to an embodiment.

FIG. 9 is a partial cross-sectional view of the light guides 840a and 840b in the image scanning apparatus 800 of FIG. 8. Referring to FIG. 9, the light guides 840a and 840b may be formed of a transparent material such as a glass or plastic of a bar shape, a length of which is arranged in a main scanning direction (y) 910.

In the present embodiment, the first light source 830a and the second light source 830b are respectively installed on end portions of the first light guide 840a and the second light guide 840b. Referring to expanded portion 920, a light source device 830 includes the first light source 830a; the second light source 830b, and a substrate 830c supplying electric power to the first and second light sources 830*a* and 830*b*. That is, the light source device 830 may be disposed the end portions of the light guides 840*a* and 840*b*.

The light guides 840*a* and 840*b* change a proceeding path of the light emitted from the light sources 830*a* and 830*b* to illuminate the light onto the object 820 placed on the document board 810. That is, the light guides 840*a* and 840*b* guide the light emitted from the light sources 830*a* and 830*b* to illumination locations. Here, the light sources 830*a* and 830*b* may include a white light emitting diode (LED).

In addition, the intensity of light emitted from the light sources 830*a* and 830*b* may be controlled by the light source control unit 100. That is, the light sources 830*a* and 830*b*, the focusing lens 860, and the image sensor 870 of FIG. 8 may respectively correspond to the light source 110, the focusing lens 131, and the image sensor 132 in the light source control unit 100 shown in FIG. 1.

Therefore, according to the image scanning apparatus 800 including the light guides 840*a* and 840*b* shown in FIGS. 8 and 9, light of sufficient intensity may be emitted to the object 820 due to the light guides 840*a* and 840*b*, and an appropriate light distribution, in which each of pixels in a focused image may provide consistent output, may be obtained. In addition, the image quality may be improved without regard to the characteristic variation of the light sources 830*a* and 830*b* and the total usage time of the light source 110 by the light source control unit 100 included in the image scanning apparatus 800.

The image scanning apparatus 800 of FIGS. 8 and 9 includes four light sources, that is, the light sources 830*a* and 830*b* and the two light guides 840*a* and 840*b*; however, the number of light sources and the number of light guides are not limited thereto.

In FIGS. 7 and 8, the components relating to the embodiment are described. Therefore, one of ordinary skill in the art would appreciate that universal components in addition to the components shown in FIGS. 7 and 8 may be included in the image scanning apparatus 700 and 800.

According to the embodiments of the present general inventive concept, the degradation in quality of the scanned images is prevented according to the characteristic variation of the light source and the total usage time of the light source, and accordingly, the image scanning apparatus may scan images having consistent image quality. In addition, lifespan of the light source in the image scanning apparatus may be increased.

In addition, other embodiments of the present general inventive concept can also be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of controlling a light source in an image scanning apparatus, the method comprising:
   emitting light from the light source onto a reference surface having a predetermined reflectivity;
   detecting a shading level representing an intensity of the light reflected from the reference surface;
   comparing the detected shading level with a reference level representing the predetermined reflectivity of the reference surface; and
   controlling the intensity of the light emitted from the light source by using the detected shading level and the reference level according to a result of the comparison,
   wherein, in the comparing of the shading level with the reference level, the shading level is compared with a predetermined range of the reference level, and in the controlling of the light intensity, the current applied to the light source is adjusted according to the ratio of the reference level with respect to the shading level to control the light intensity, when the shading level is not included in the predetermined range of the reference level.

2. The method of claim 1, wherein the controlling of the light intensity is performed by adjusting electric current or voltage applied to the light source according to a ratio of the reference level with respect to the detected shading level.

3. The method of claim 1, determining the reference level by referencing data representing scanning properties of the image scanning apparatus,
   wherein the detected shading level is compared with the determined reference level, and the intensity of the light emitted from the light source is controlled by using the detected shading level and the determined reference level according to a result of the comparison.

4. The method of claim 1, wherein, in the comparing of the shading level with the reference level, the shading level is compared with a predetermined range of the reference level, and in the controlling of the light intensity, the current applied to the light source is adjusted by adjusting a duty ratio of a pulse width modulation (PWM) signal according to the ratio of the reference level with respect to the shading level to control the light intensity, when the shading level is not included in the predetermined range of the reference level.

5. The method of claim 1, wherein when the current adjusted to control the light intensity is equal to or greater than a predetermined magnitude, the controlling of the light intensity is performed by using a current of the predetermined magnitude.

6. A non-transitory computer readable recording medium having embodied thereon the method according to claim 1.

7. A light source control apparatus for controlling a light source of an image scanning apparatus, the light source control apparatus comprising:
   a light source to emit light onto a reference surface having a predetermined reflectivity;
   a detector to detect a shading level representing an intensity of the light reflected from the reference surface, wherein the detector detects image data of a document from the light scanned and reflected from the document;
   a storage unit to store a reference level representing the predetermined reflectivity of the reference surface;
   a comparator to compare the shading level with the reference level stored in the storage unit;

a light intensity controller to control the intensity of the light emitted from the light source by using the detected shading level and the reference level according to a comparison result; and an output unit to output the detected image data, wherein the comparator compares the shading level with a predetermined range of the reference level stored in the storage unit, and the light intensity controller controls the light intensity by adjusting the current applied to the light source according to the ratio of the reference level with respect to the shading level, when the shading level is not included in the predetermined range of the reference level.

8. The light source control apparatus of claim 7, wherein the light intensity controller controls the light intensity by adjusting an electric current or voltage applied to the light source according to a ratio of the reference level with respect to the shading level.

9. The light source control apparatus of claim 7, further comprising a reference level determiner to determine the reference level by referencing data representing scanning properties of the image scanning apparatus.

10. The light source control apparatus of claim 7, wherein the comparator compares the shading level with a predetermined range of the reference level stored in the storage unit, and the light intensity controller controls the light intensity by adjusting a duty ratio of a PWM signal according to the ratio of the reference level with respect to the shading level to adjust the current applied to the light source, when the shading level is not included in the predetermined range of the reference level.

11. The light source control apparatus of claim 7, wherein when the current adjusted to control the light intensity is equal to or great than a predetermined magnitude, the light intensity controller controls the light intensity by using the current of the predetermined magnitude.

12. The light source control apparatus of claim 7, further comprising a light guide to guide a proceeding path of the light emitted from the light source toward the reference surface.

13. An image scanning apparatus comprising:
a detector to detect a shading level that represents an intensity of light which is emitted onto a reference surface having a predetermined reflectivity and reflected from the reference surface, wherein the detector detects image data of a document from the light emitted and reflected from the document;
a comparator to compare the shading level with a reference level that represents the predetermined reflectivity of the reference surface;
a light intensity controller to control the intensity of the light emitted from the light source by using the shading level and the reference level according to the comparison result; and
an output unit to output the detected image data,
wherein the comparator compares the shading level with a predetermined range of the reference level, and the light intensity controller controls the light intensity by adjusting the current applied to the light source according to the ratio of the reference level with respect to the shading level, when the shading level is not included in the predetermined range of the reference level.

14. The image scanning apparatus of claim 13, further comprising:
a light source to emit light onto the reference surface; and
a light guide to guide a proceeding path of the light emitted from the light source toward the reference surface.

15. An image forming apparatus comprising:
an image scanning apparatus to detect a shading level that represents an intensity of light which is emitted onto a reference surface having a predetermined reflectivity and reflected from the reference surface, to compare the shading level with a reference level that represents the predetermined reflectivity of the reference surface, controlling the intensity of the light emitted from the light source by using the shading level and the reference level according to the comparison result, to scan image data of a scanned object from the light reflected from the scanned object; and
an image forming unit to form an image of printing data representing the image data scanned by the image scanning apparatus,
wherein, in the comparing of the shading level with the reference level, the shading level is compared with a predetermined range of the reference level, and in the controlling of the light intensity, the current applied to the light source is adjusted according to the ratio of the reference level with respect to the shading level to control the light intensity, when the shading level is not included in the predetermined range of the reference level.

16. The image forming apparatus of claim 15, further comprising:
a fax unit to transmit fax data converted from the image data scanned by the image scanning apparatus via a fax; and
a transmission performer to transmit transmission data converted from the image data scanned by the image scanning apparatus to external devices.

17. The image forming apparatus of claim 15, further comprising:
a light source to emit light; and
a light guide to guide a proceeding path of the light emitted from the light source to the scanned object.

18. The image forming apparatus of claim 17, wherein the light source comprises first and second light sources,
the light guide comprises first and second light guides, and
first and second light sources are respectively installed on end portions of the first and second light guides.

* * * * *